Patented July 3, 1951

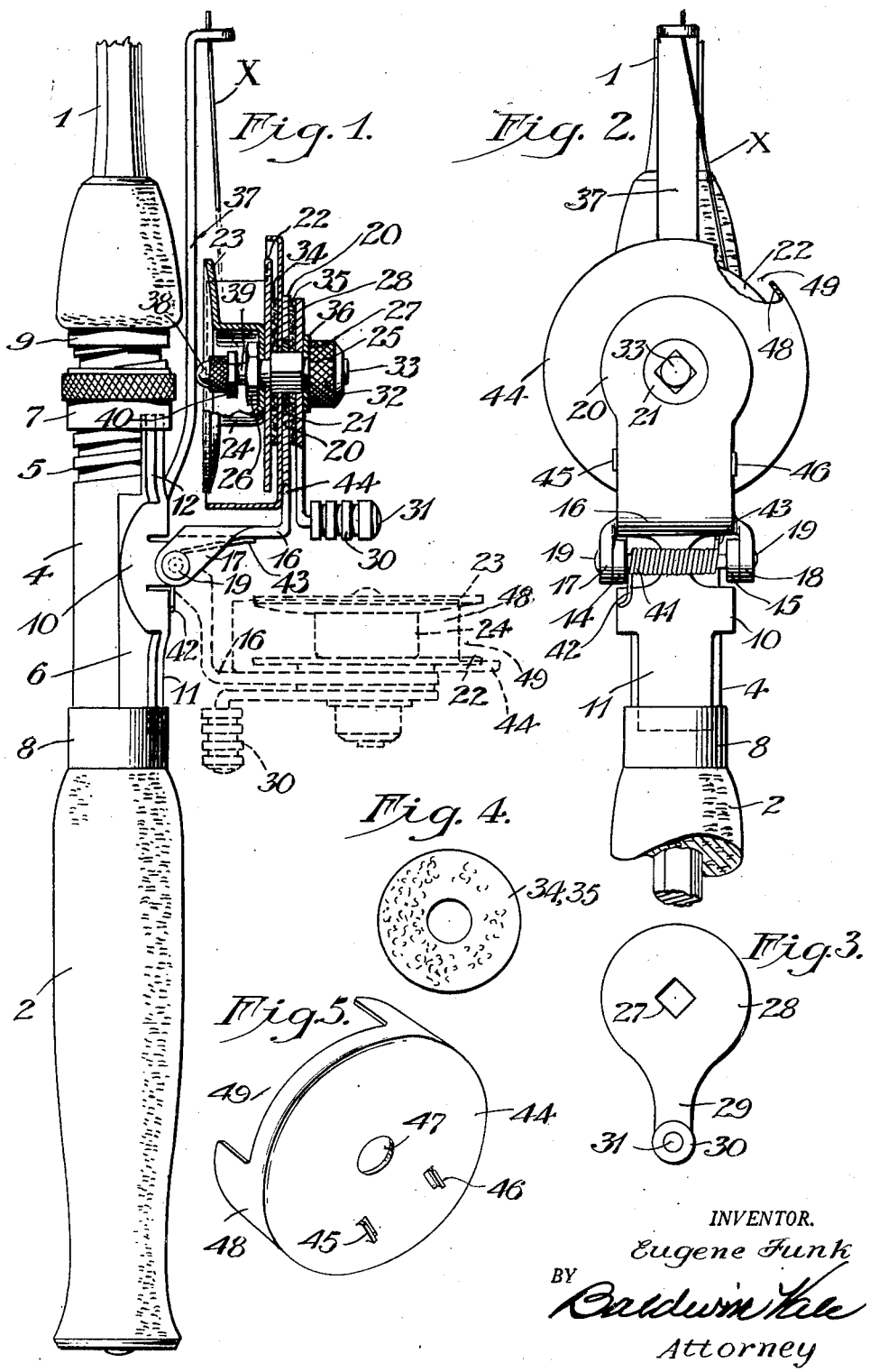

2,559,215

UNITED STATES PATENT OFFICE 2,559,215

CASTING REEL

Eugene Funk, Preston, Nev.

Application May 18, 1948, Serial No. 27,739

4 Claims. (Cl. 242—84.5)

This invention relates to casting reels and more particularly to spinning reels for fly casting in sport fishing.

Among the objects of the invention is the provision of a convertible winding and spinning reel.

Another object is to simplify the structure and mode of operation of such reels.

A further object is the provision of such a reel that may be converted from one position to the other with one hand, and which may be used either right or left handed without changing the mounting of the reel on the pole.

Other objects and advantages will appear as the description proceeds. In the specification and the accompanying drawings the invention is disclosed in its preferred form. But it is to be understood that it is not limited to this form; because it may be embodied in modifications within the spirit of the invention as defined in the claims following the description.

In the one sheet of drawings:

Fig. 1 is a side elevation of a fishing reel constructed in accordance with this invention, shown in partial vertical section and mounted upon a conventional casting rod, in the reeling in position; the casting position being indicated in dotted lines.

Fig. 2 is a front elevation of the same with the crank member removed.

Fig. 3 is a detail in front elevation of the crank member.

Fig. 4 is a front view detail of one of the friction discs.

In detail the structure shown in Fig. 1, comprises the conventional casting rod 1, having the cork handle 2, telescoping over the end of the rod. The plastic body 4 is superimposed on the rod above the handle and has the acme threaded portion 5 at its upper end and the reduced segmental portion 6 above the handle. The threaded portion has the annular running nut 7 threaded thereon. The body 4 is joined to the handle and the rod by the base ferrule 8 at the bottom and the stop ferrule 9 at the top. With variations this is the conventional practice in the fabrication of flycasting rods.

The reel assembly has the base 10 overlying the reduced portion 6, with the lower lug 11 inserted within the ferrule 8, and the divided lug 12 at the top and fixed to the body portion by the knurled nut 7.

The interspaced lugs 14, 15, are struck outwardly from the body of the base 10. The swing bracket 16 has the lateral lugs 17, 18, pivoted on the crosspin 19 extending between these lugs. The swing bracket has the circular friction plate 20, with a round hole through the axis thereof. The bearing washer 21 fits freely within the axial hole in the bracket, and has a square axial hole therethrough. This bracket is adapted to swing forward and back relative to the length of said rod.

The reel spool comprises the circular side plates 22, 23, the plate 23 having the upset center portion 24 contacting the plate 22, and forming a drum upon which the fish line is wound. The reel spool has an axial hole fitting snugly on the reduced portion 25 of the connecting bolt having the nut 26 bearing against the plate 23 to lock the spool on the shaft 39. The square portion of the bolt passes through the bearing washer 21, and a square hole 27 in the friction disc 28, having the crank extension 29, with the handle 30 rotatable on the laterally extending pivot 31.

The tension nut 32 is threaded on the outer end 33 of the bolt to bind the reel assembly together. The friction washers 34, 35 are interposed between the reel plate 22 and the handle disc 28 and the opposite sides of the bracket plate 20, respectively. The friction washer 36, is interposed between the nut 32, and the disc 28 and they function as a friction nut-lock to hold the nut in adjusted position.

The extension 37 is an integral part of the base 10 and is struck outwardly therefrom and divides the lug 12 and functions as a lineguide and as an element for adjusting the reel spool relative to the axis of the pole. This adjusting means comprises the acorn adjusting nut 38 running on the threaded stem 39 of the bolt and held in adjusted position by the lock nut 40, and bearing against the extension 37. This enables the tilting of the axis of the bolt 33 to an angle exactly perpendicular to the axis of the fishline X. This causes the reeled-in line to build up helically on the reel drum 24, without piling up in one position or criss-crossing. This smooth helical condition also facilitates the free spinning of the line over the periphery of the side plate 23.

The reel assembly is normally held in the position shown in Fig. 1, by the spiral spring 41, surrounding the pivot pin 19, with its opposite ends 42, 43, bearing against the base 10 and the bracket 16, respectively.

This invention operates substantially as follows: Referring to Fig. 1, in ordinary fishing with a weighted line, the handle 2 is grasped by the fisherman with his thumb beneath the bracket 16. The nut 32 is backed off to allow the reel free play in casting the line 40. The line is reeled in by turning the handle 30, in the usual manner.

For flycasting with a light lure, it is essential that the line have the minimum frictional resistance, best accomplished by the "spinning" technique. In this instance the forefinger of the operator pulls down on the handle 30, against the tension of the spring 41, and holds the reel assembly in the position indicated in dotted lines in Fig. 1. This permits the line X to pay off around the periphery of the reel plate 23, without rotating the reel, and with the least resistance to the flow of the line.

When a fish strikes, the handle 30 is released and the reel flips back to the original position, and the catch may be played by reeling in the line or paying out the line in the usual manner. If a braking resistance is desired, the tension nut 32 is screwed in to increase the drag of the friction plates 34, 35, against the opposite sides of the stationary bracket 16.

The line guard 44 is provided to prevent the line X from over-riding the sides 22, 23, of the reel spool, while reeling in the line; and to prevent looping and snarling of the line while spinning over the periphery of the side plate 23, as in the dotted position in Fig. 1. This guard comprises the plate 44, interposed between the bracket portion 20 and the friction disc 34 contacting the side plate 22 of the reel spool. It has the interspaced lugs 45, 46 straddling the bracket 16 and preventing the rotation of the guard, which has the center hole 47, clearing the square portion of the bolt 33. The guard has the peripheral flange 48 with the gap 49 in front of the reel spool, through which the line X is reeled in, as described.

The whole structure of the reel is adapted to fabrication in sheet aluminum for lightness, except the bearing washer 21 and the disc 28, preferably made of brass to reduce frictional wear.

Having fully described this invention and its mode of operation, what I claim and desire to secure by Letters Patent is:

1. A convertible casting and spinning reel, comprising a base attachable to a rod; a bracket pivotally mounted on said base and having a bearing washer therein; a reel spool on one side of said bracket, and a handle member on the opposite side of said bracket; and a bolt fixed to said spool and having a square portion passing through said bearing washer and handle member; friction members interposed between said reel spool and handle member; and a tension nut on the outer end of said bolt for regulating the friction between said friction members, reel spool and handle member respectively.

2. A convertible casting and spinning reel, comprising a base attachable to a rod; a bracket pivotally mounted on said base and adapted to swing forward and rearward relative to the length of said rod; a bearing washer rotatable within the thickness of said bracket; a reel spool having a square bolt fixed thereto and passing through a square hole in said bearing washer; a handle member engaging the square of said bolt; a tension nut threaded on the outer end of said bolt; and friction means interposed between said reel, bracket, and handle member, respectively.

3. A convertible casting and spinning reel, comprising a base attachable to a rod and having an extension portion; a bracket pivotally mounted on said base and adapted to swing forward and rearward relative to the length of said rod; a bearing washer rotatable within the thickness of said bracket; a reel spool having a square bolt fixed thereto and passing through a square hole in said washer; a handle member engaging the square of said bolt; compressible friction members interposed between said reel spool and handle member; a tension nut threaded on the outer end of said bolt for compressing said friction members; and an adjustable nut threaded on the inner end of said bolt and bearing against said extension.

4. A convertible casting and spinning reel comprising a base attachable to a rod; a bracket pivotally mounted on said base; a reel spool having a bolt fixed thereto and passing through and rotatable within said bracket; a handle member engaging the outer end of said bolt; a nut threaded on the inner end of said bolt and bearing against a portion of said base; and a spring normally holding said nut against said base portion.

EUGENE FUNK.

REFERENCES CITED

The following references are of record in the file of this patent:

UNITED STATES PATENTS

| Number | Name | Date |
|---|---|---|
| 1,617,543 | Roberts | Feb. 15, 1927 |
| 2,083,689 | Clifford | June 15, 1937 |
| 2,327,469 | Teitsma | Aug. 24, 1943 |

FOREIGN PATENTS

| Number | Country | Date |
|---|---|---|
| 183,277 | Great Britain | July 27, 1927 |
| 813,087 | France | Feb. 15, 1937 |